United States Patent [19]

Murata et al.

[11] Patent Number: 5,910,548
[45] Date of Patent: Jun. 8, 1999

[54] PROCESS FOR PRODUCING MODIFIED EPOXY RESIN, MODIFIED EPOXY RESIN PRODUCED, AND EPOXY RESIN COMPOSITION THEREOF

[75] Inventors: Yasuyuki Murata; Norio Tohriiwa; Yoshinori Nakanishi, all of Yokkaichi, Japan

[73] Assignee: Shell Oil Company, Houston, Tex.

[21] Appl. No.: 08/898,021

[22] Filed: Jul. 22, 1997

Related U.S. Application Data

[63] Continuation of application No. 08/430,524, Apr. 27, 1995, abandoned.

[30] Foreign Application Priority Data

Apr. 27, 1994 [JP] Japan ..................................... 6-110232

[51] Int. Cl.[6] ......................................................... C08F 20/00
[52] U.S. Cl. ........................... 525/438; 525/463; 525/481; 525/533; 525/534; 528/100; 528/112; 528/370; 528/371
[58] Field of Search ..................................... 525/438, 463, 525/481, 533, 534; 528/100, 112, 370, 371

[56] References Cited

U.S. PATENT DOCUMENTS

| | | | |
|---|---|---|---|
| 2,910,454 | 10/1959 | Clark et al. | 528/100 |
| 3,754,173 | 8/1973 | Eustance | 317/259 |
| 4,229,382 | 10/1980 | Mayer et al. | 524/128 |
| 4,297,457 | 10/1981 | Stark, Jr. | 525/507 |
| 5,202,401 | 4/1993 | Yokoi | 526/273 |

FOREIGN PATENT DOCUMENTS

| | | |
|---|---|---|
| 55-118930 | 9/1980 | Japan . |
| 62-053327 | 3/1987 | Japan . |
| 62-53327 | 3/1987 | Japan . |
| 62-212416 | 9/1987 | Japan . |
| 63-3074 | 1/1988 | Japan . |
| 3-119027 | 5/1991 | Japan . |

OTHER PUBLICATIONS

Database WPI — Derwent Publications Ltd. London, G.B. AN 80–06235C & JP–A–54/155,298 (Teijin KK) Dec. 7, 1979 — See Abstract, Sep. 19, 1995.
Database WPI — Derwent Publications Ltd. London, G.B. AN 72–80925T & SU–A–328,134 (PRI 2, E.A. Feb. 2, 1972, See Attachment, Sep. 19, 1995.
Database WPI — Derwent Publications Ltd. London, G.B. AN 71–41899s & JP–B — 46/021, 898 (Teijin KK) Jun. 22, 1971 — See Abstract, Sep. 19, 1995.
Makrom Chem., vol. 180, 1979 pp. 501–503 K. Funa Hashi: New Preparation of Polyethers with Pendant Ester Groups and a Poly(ether–carbonate), Sep. 19, 1995.

*Primary Examiner*—Randy Gulakowski

[57] ABSTRACT

The process for producing a modified epoxy resin comprises reacting (a) an epoxy resin having at least two epoxy groups per one molecule, and (b) a specific active ester group-containing compound having at least two aromatic ring-bonded active ester groups per one molecule, in proportions such that the amount of the active ester groups in the active ester group-containing compound is from about 0.05 to about 0.95 mol per mole of the epoxy group in the epoxy resin, and the modified epoxy obtained by this process, and a composition of the epoxy resin and a curing agent are encompassed.

9 Claims, No Drawings

PROCESS FOR PRODUCING MODIFIED EPOXY RESIN, MODIFIED EPOXY RESIN PRODUCED, AND EPOXY RESIN COMPOSITION THEREOF

This is a continuation of application Ser. No. 08/430,524, filed Apr. 27, 1995 now abandoned.

FIELD OF THE INVENTION

The present invention relates to a process for producing a modified epoxy resin which gives a cured resin having excellent moisture resistance and electrical characteristics, the modified epoxy resin thus produced, and the modified epoxy resin composition. The present invention also relates to an epoxy resin composition which gives a cured resin having excellent moisture resistance and electrical characteristics.

BACKGROUND OF THE INVENTION

An epoxy resin is widely used in fields of adhering, casting, sealing, laminating, molding, coating, and the like from the standpoints of its excellent cured properties and easy handling property.

In general, epoxy resins obtained by reacting a compound having an active hydrogen, such as a phenol compound, an amine compound, or a polycarboxylic acid with epihalohydrin are widely used as the epoxy resin. Further, modified epoxy resins obtained by further reacting the above-described epoxy resin with a compound having an active hydrogen to thereby control the molecular weight or impart additional functions to the epoxy resin are also widely used.

For example, the epoxy resin and a polyhydric phenol compound are reacted to increase a molecular weight of the epoxy resin, whereby a flexibility thereof can be improved and flow property thereof at molding can be controlled. Further, a flame retardancy can be imported to the epoxy resin by reacting the epoxy resin with a brominated phenol compound to thereby introduce a bromine atom into the epoxy resin.

Recently, various properties required in resin material become severe with the progress of various techniques and change of use environment, and in particular, improvement in moisture resistance or the like is an important problem in various use fields such as adhering, casting, sealing, molding, laminating, coating, and the like. Further, where the epoxy resin is used in an electrical field, improvement in electrical properties is also an important problem. However, modified epoxy resins generally used recently are not sufficiently satisfied with the required properties.

That is to say, modified epoxy resins obtained by a production process comprising reacting an epoxy resin widely used with a compound having an active hydrogen, such as a phenol compound, an amine compound, or a polycarboxylic acid do not have sufficient moisture resistance and electrical properties.

In the conventional production method comprising reacting the epoxy resin with a compound having an active hydrogen, a hydroxyl group having a high polarity is formed by a reaction between an epoxy group and an active hydrogen group, resulting in deterioration of the moisture resistance and the electrical properties of the modified epoxy resin.

Various improvements such as change of skeleton, modification, and the like have been attempted in conventional production processes. However, unless the above-described basic problems are overcome, modified epoxy resins having sufficiently satisfactory moisture resistance and electrical properties cannot be produced.

One object of the present invention is to provide a modified epoxy resin which gives a cured resin having excellent moisture resistance and electrical properties. Another object of the present invention is to provide a process for producing the modified epoxy resin. Still another object of the present invention is to provide an epoxy resin composition which gives a cured resin having excellent moisture resistance and electrical properties.

SUMMARY OF THE INVENTION

Accordingly, the process for producing a modified epoxy resin is provided comprising reacting (a) an epoxy resin having at least two epoxy groups per one molecule, and (b) an active ester group-containing compound having at least two aromatic ring-bonded active ester groups represented by the following chemical formula (1) or (2):

wherein A represents a substituted or unsubstituted phenyl group or naphthyl group;

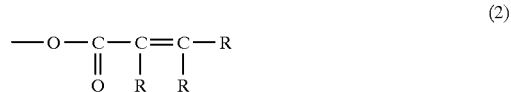

wherein R which may be the same or different each represents hydrogen atom, an alkyl group having 1 to 10 carbon atoms, a substituted or unsubstituted phenyl group, a substituted or unsubstituted aralkyl group, an alkoxy group, or a halogen atom, in proportions such that the amount of the active ester group in the active ester group-containing compound is from about 0.05 to about 0.95 mol per mole of the epoxy group in the epoxy resin.

It has been found that the above objects can be achieved by employing a production process utilizing a reaction which does not form a structure which adversely affects the moisture resistance and the electrical properties.

DETAILED DESCRIPTION OF THE INVENTION

In the process for producing the modified epoxy resin according to the present invention, the epoxy group in the epoxy resin is inserted in the active ester group in the active ester group-containing compound, whereby the epoxy resin and the active ester group-containing compound are bonded, thereby increasing the molecular weight to form a modified epoxy resin. The reaction utilized to insert the epoxy group into the active ester bond is a reaction represented by the following reaction formula (I). This reaction does not form a hydroxyl group, and the modified epoxy resin produced has a low polarity. Therefore, the modified epoxy resin has excellent moisture resistance and electrical properties.

Reaction Formula (I)

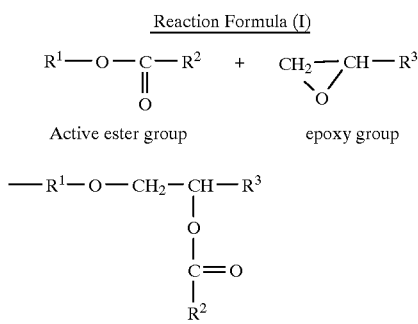

Active ester group      epoxy group

The epoxy resin (a) used to produce the modified epoxy resin of the present invention is an epoxy resin having at least two epoxy groups per one molecule.

Examples of the epoxy resin used include epoxy resins produced from various phenols (e.g., bisphenol A, bisphenol F, bisphenol AD, hydroquinone, resorcin, methyl resorcin, biphenol, tetramethyl biphenol, dihydroxynaphthalene, tetrabromobisphenol A, dihydroxydiphenyl ether, dihydroxydibenzophenone, dihydroxydiphenyl sulfone phenol novolak resin, cresol novolak resin, bisphenol A novolak resin, dicyclopentadiene phenol resin, terpene phenol resin, phenol aralkyl resin, naphthol novolak resin, or brominated phenol novolak resin), or various phenol-type compounds such as polyhydric phenol resins obtained by condensation reaction of various phenols and various aldehydes (e.g., hydroxybenzaldehyde, crotonaldehyde, or glyoxal), and epihalohydrin; epoxy resins produced from various amine compounds (e.g., diaminodiphenyl methane, aminophenol, or xylene diamine), and epihalohydrin; epoxy resins produced from various carboxylic acids (e.g., methylhexahydroxyphthalic acid or dimer acid), and epihalohydrin; and the like.

Of those epoxy resins, an epoxy resin produced from bisphenol A, bisphenol F, biphenol, tetramethyl biphenol, tetrabromobisphenol A, phenol novolak resin, cresol novolak resin, bisphenol A novolak resin, or brominated phenol novolak resin, and epihalohydrin is preferred from the standpoints of cured properties of the modified epoxy resin formed and the easy availability of the starting materials.

Those epoxy resins can be used alone or as mixtures of two or more thereof.

The active ester group-containing compound (b) which is another starting material used to produce the modified epoxy resin of the present invention is a compound having at least two aromatic ring-bonded active ester groups per one molecule. The chemical structure of the compound (b) is not particularly specified, but examples thereof are compounds represented by the following structural formulae 1, 2, and 3:

[Structural Formula 1]

$A^1-(X^1)n^1$ wherein $A^1$ represents $n^1$ valent, substituted or unsubstituted phenol group or naphthyl group, $X^1$ which may be the same or different each represents the active ester group represented by the chemical formula (1) or (2), and $n^1$ is an integer of from 2 to 6.

[Structural Formula 2]

wherein $A^2$ which may be the same or different each represents ($n^2$+1) valent, substituted or unsubstituted phenol group or naphthyl group, $X^2$ which may be the same or different each represents an active ester group represented by the chemical formula (1) or (2), Y represents a $p^1$ valent hydrocarbon group having 1 to 10 carbon atoms, $n^2$ is an integer of from 1 to 6, $p^1$ is an integer of from 2 to 4.

[Structural Formula 3]

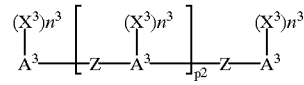

wherein $A^3$ which may be the same or different each represents ($n^3$+1) valent or ($n^3$+2) valent, substituted or unsubstituted phenyl group or naphthyl group, $X^3$ which may be the same or different each represents an active ester group represented by the chemical formula (1) or (2), Z which may be the same or different each represents direct bond, a divalent hydrocarbon group having 1 to 10 carbon atoms, —O—, —CO—, or —SO$_2$—, $n^3$ is an integer of from 1 to 6, and $p^2$ is an integer of from 0 to 10.

The method for preparing the active ester group-containing compound is not particularly limited, but a method is generally used, which comprises actively esterifying the whole or part of phenolic hydroxyl groups in the polyhydric phenol compound.

The polyhydric phenol compound which is a base for the active ester group-containing compound is a compound having at least two phenolic hydroxyl groups per one molecule. For example, the compound represented by the structural formula 1 can be prepared where resorcin, hydroquinone, methyl resorcin, trihydroxybenzene, dihydroxynaphthalene, trihydroxynaphthalene, or the like is used.

Further, the compound represented by the structural formula 2 can be prepared where bisphenol A, bisphenol F, tetrabromobisphenol A, trisphenol methane, tetraphenol ethane, or the like is used.

Furthermore, the compound represented by the structural formula 3 can be prepared where biphenol, tetramethyl biphenol, phenol novolak resin, cresol novolak resin, bisphenol A novolak resin, dicyclopentadiene phenol resin, terpene phenol resin, phenol aralkyl resin, naphthol novolak resin, brominated phenol novolak resin, dihydroxyphenyl ether, dihydroxybensophenone, dihydroxyphenyl sulfone, or the like is used.

The method for actively esterifying those polyhydric phenol compounds is not particularly limited, but a method is generally used, which comprises reacting an actively esterifying agent represented by the following structural formula (I) or (II) with the polyhydric phenol compound.

Structural Formula (I)

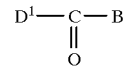

wherein B represents a substituted or unsubstituted phenyl group or naphthyl group, $D^1$ represents hydroxyl group, an alkoxy group, a substituted or unsubstituted phenoxy group, a substituted or unsubstituted naphthoxy group, a substituted or unsubstituted benzoate group, a substituted or unsubstituted naphthoate group, or a halogen atom.

Structural Formula (II)

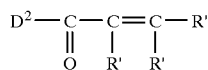

wherein R' which may be the same or different each represents hydrogen atom, an alkyl group having 1 to 10 carbon atoms, a substituted or unsubstituted phenyl group, a substituted or unsubstituted aralkyl group, an alkoxy group, or a halogen atom, and $D^2$ represents hydroxyl group, an alkoxy group, a substituted or unsubstituted phenoxy group, a substituted or unsubstituted naphthoxy group, a substituted or unsubstituted benzoate group, a substituted or unsubstituted naphthoate group, or a halogen atom.

A reaction method between the polyhydric phenol compound and the active esterifying agent is not particularly limited, and the respective appropriate reaction method or reaction condition can be employed depending on the types of the polyhydric phenol compound and active esterifying agent used. In general the following method is employed.

The respective components are mixed in the presence of an organic solvent or in a non-solvent state. The resulting mixture is reacted at a temperature of from about 0 to about 150° C. for from about 1 to about 10 hours in the presence of a catalyst. The unreacted active esterifying agent, by-products, solvents, and the like are removed to obtain the desired active ester group-containing compound.

Examples of the reaction catalyst used are amines such as trimethyl amine, triethyl amine, benzyldimethyl amine or pyridine; an alkali metal alcolate such as potassium-t-butoxide or sodium ethoxide; alkyl metals such as butyl lithium or biphenyl sodium; acidic catalysts such as hydrochloric acid; sulfuric acid; oxalic acid; fluoroacetic acid; toluenesulfonic acid; organic acid salts showing an acidity; fluoroboric acid, heteropolysalts; polyphosphoric acids; or activated clay; and the like.

Further, in the reaction, an inert organic solvent such as ketones (e.g., acetone, methyl ethyl ketone; or methyl isobutyl ketone); aromatic hydrocarbons (e.g., benzene, toluene, or xylene); ethers (e.g., dioxane, or ethylene glycol dimethyl ether); a non-protonic polar solvent (e.g., dimethyl sulfoxide, or dimethyl formamide); or the like can be used as a reaction solvent.

The active ester group-containing compound used in the present invention may contain a group other than the active epoxy group, as a functional group which reacts with the epoxy resin. The proportion thereof is preferably 50 percent or less of the total number of the functional groups. If the proportion of the group other than the active ester group, which reacts with the epoxy group is too large, the effect of the present invention is not sufficient. Example of the group which reacts with the epoxy resin, other than the active ester group is a phenolic hydroxyl group.

Those active ester group-containing compounds can be used alone or as mixtures of two or more thereof.

The production process of the present invention is a process for producing a modified epoxy resin, which comprises reacting the above-described epoxy resin and the above-described active ester-containing compound. The proportions of those epoxy resin and active ester group-containing compound used are such that the amount of the active ester groups in the active ester group-containing compound is from about 0.05 to about 0.95 mol, and preferably from about 0.1 to about 0.7 mol per mole of the epoxy group in the epoxy resin.

If the amount of the active ester group-containing compound used is too small, the molecular weight of the modified epoxy resin of the present invention which is the final desired product is relatively small, and the modification effect is decreased. Further, if the amount of the compound is too large, the molecular weight of the modified epoxy resin of the present invention becomes too large, and the viscosity thereof increases, resulting in difficulty to handling the same.

The reaction between the epoxy resin and the active ester group-containing compound can be conducted according to the conventional method.

That is, the respective components are melt-kneaded, and reacted at a temperature of from about 80 to about 200° C. for from about 1 to about 10 hours in the presence of a catalyst, thereby obtaining the desired modified epoxy resin.

Examples of the reaction catalyst are imidazoles such as 2-methyl imidazole or 2-ethyl-4-methyl imidazole; amines such as 2,4,6-tris(dimethylamino-methyl)phenol, benzyl dimethylamine or 1,8-diazabicyclo(5,4,0)-7-undecene; quaternary ammonium salts such as tetramethylammonium chloride, tetramethylammonium hydroxide, or benzyl trimethylammonium bromide; phosphines such as tributylphosphine, triphenylphosphine, or tris (dimethoxyphenyl)phosphine; phosphonium salts such as ethyltriphenylphosphonium iodide, ethyltriphenylphosphonium chloride or tetrabutylphosphonium bromide; alkali metal hydroxides such as sodium hydroxide, or potassium hydroxide; alkali metal salts such as sodium bicarbonate, sodium benzoate, or lithium chloride; and the like. The amount of the reaction catalyst used is from about 50 to about 3000 ppm to the epoxy resin.

Further, an inert organic solvent may be used as a reaction solvent in the reaction. Examples of the inert organic solvent are alcohols such as ethanol or isopropanol; ketones such as acetone, methyl ethyl ketone, or methyl isobutyl ketone; aromatic hydrocarbons such as benzene, toluene, or xylene; aromatic hydrocarbons such as benzene, toluene, or xylene; ethers such as dioxane or ethylene glycol dimethyl ether; glycol ethers such as ethylene glycol monomethyl ether, ethylene glycol monoethyl ether of propylene glycol monomethyl ether; non-protonic polar solvents such as dimethyl sulfoxide, or dimethyl formamide.

The modified epoxy resin thus prepared is, for example, a compound represented by the following structural formula (III) where an epoxy resin obtained by the reaction of bisphenol A and epihalohydrin is used as the epoxy resin and a dibenzoate of bisphenol A is used as the active ester group-containing compound, and is a compound represented by the following structural formula (IV) where an epoxy resin obtained by the reaction of 3,3',5,5'-tetramethyl-4,4'-biphenol and epihalohydrin is used as the epoxy resin and a diacrylate of tetrabromobisphenol A is used as the active ester group-containing compound.

Structural Formula (III)

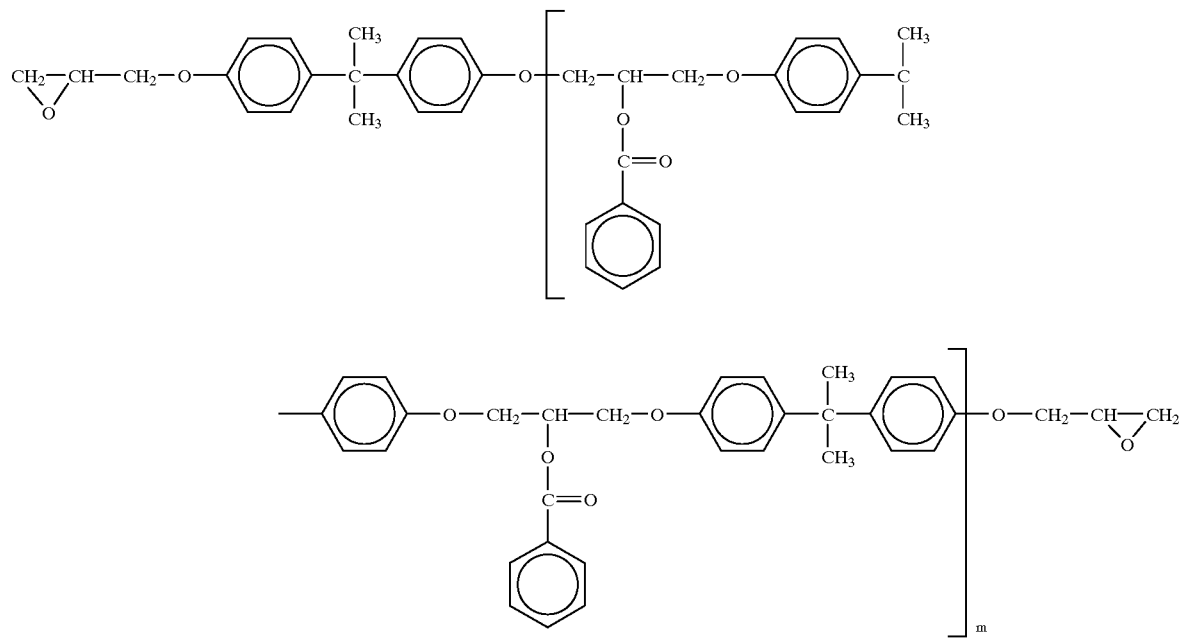

wherein m is a number of from 0.1 to 5 in the average value.

Structural Formula (IV)

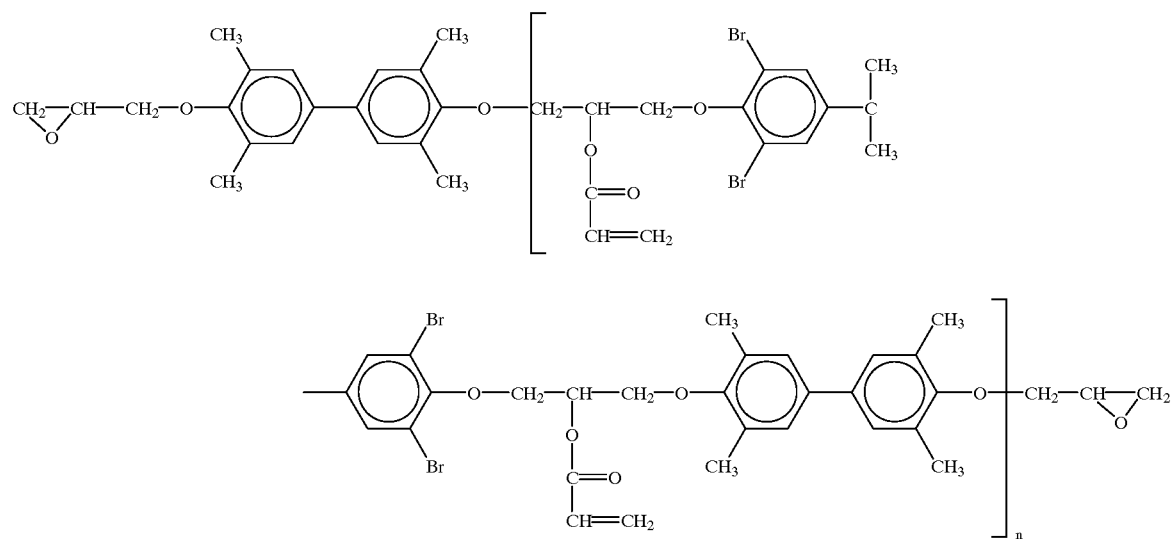

wherein n is a number of from 0.1 to 5 in the average value.

The epoxy resin composition according to the present invention is an epoxy resin composition comprising the epoxy resin of the present invention and a hardener for the epoxy resin as essential components. The epoxy resin composition can contain other epoxy resins for the purpose of, for example, improving a workability or cured properties.

Examples of the other epoxy resins which can be added are an epoxy resin prepared from various phenol-type compounds such as various phenols (e.g., bisphenol A, bisphenol F, bisphenol AD, hydroquinone, resorcin, methyl resorcin, biphenol, tetramethyl biphenol, dihydroxynaphthalene, tetrabromobisphenol A, dihydroxydiphenyl ether, dihydroxydibenzophenone, dihydroxydiphenyl sulfone, a phenol novolak resin, a cresol novolak resin, a bisphenol A novolak resin, a dicyclopentadiene phenol resin, a terpene phenol resin, a phenol aralkyl resin, a naphthol novolak resin, or a brominated phenol novolak resin, or the like); an epoxy resin prepared from various phenols, various phenol compounds such as polyhydric phenol resins or the like, obtained by condensation reaction with various aldehydes (e.g., hydroxybenzoaldehyde, crotonealdehyde or glyoxal)

and epihalohydrin; an epoxy resin prepared from an amine compound such as diaminophenylmethane, aminophenol or xylene diamine, and epihalohydrin; an epoxy resin prepared from various carboxylic acids such as methylhexahydroxyphthalic acid or dimer acid, and epihalohydrin; or the like.

The amount of the other epoxy resins which can be added is preferably 100 parts by weight or less per 100 parts by weight of the modified epoxy resin. If the amount of the other epoxy resins used is too large, the cured properties possessed by the modified epoxy resin of the present invention are not sufficiently exhibited.

The curing agent for the epoxy resin formulated in the epoxy resin composition of the present invention is a general curing agent for epoxy resins, and various types of the curing agents are used depending on the purpose of the use and the required characteristics of the epoxy resin composition.

Examples of the curing agent for the epoxy resin composition comprising the epoxy resin composition of the present invention and the other epoxy resins are various phenol resins such as a phenol novolak resin, a cresol novolak resin, a bisphenol A novolak resin, a dicyclopentadiene phenol resin, a phenol aralkyl resin or a terpene phenol resin; various phenols; various phenol resins such as a polyhydric phenol obtained by condensation reaction of various phenols and various aldehydes (e.g., hydroxybenzaldehyde, croton aldehyde or glyoxal); acid anhydrides such as methyltetrahydrophtholic anhydride, hexahydrophtholic anhydride, pyromellitic anhydride or methylnadic acid; amines such as diethylene triamine, isophorone diamine, diaminodiphenol methane, diaminodiphenyl sulfone or dicyan diamide; and the like.

Similar to the conventional epoxy resin composition, the epoxy resin composition of the present invention can contain various additives. Examples of the various additives are a curing accelerator, a filler, a coupling agent, a flame retardant, a plasticizer, a solvent, a reaction diluent, a pigment, and the like. Those additives can be appropriately added if required and necessary.

Examples of the curing accelerator are imidazoles such as 2-methyl imidazole or 2-ethyl-4-methyl imidazole; amines such as 2,4,6-tris(dimethylaminomethyl) phenol, benzyl dimethyl amine or 1,8-diazabicyclo (5,4,0)-7-undecene; organophosphorus compounds such as tributyl phosphine, triphenyl phosphine or tris(dimethoxyphenyl)phosphine; and the like.

Examples of the filler are a fused silica, a crystalline silica, a glass powder, alumina, calcium carbonate, and the like. Examples of the flame retardant are antimony trioxide, phosphoric acid, and the like. Further, the flame retardancy can be achieved by using a brominated epoxy resin as a part of the epoxy resin used.

The modified epoxy resin and the epoxy resin composition according to the present invention provide a cured resin having excellent moisture resistance and electrical characteristics, and therefore they can advantageously be used in various uses such as coating, adhering, casting, sealing, molding, laminating, and the like.

ILLUSTRATIVE EMBODIMENTS

The present invention is described in more detail by reference to the following nonlimiting preparation examples of the active ester group-containing compound, examples of the modified epoxy resin of the present invention and the epoxy resin composition of the present invention, and comparative examples, but it should be understood that the invention is not construed as being limited thereto.

PREPARATION EXAMPLES 1 TO 4

In a 3-liter three-necked flask equipped with a thermometer, a stirrer, and a cooling tube were charged with hydroquinone, bisphenol A, tetrabromobisphenol A, or a phenol novolak resin as a phenol compound, benzoyl chloride, methacrylic acid chloride, as an active esterifying agent, and pyridine in the respective amount shown in Table 1 below. The resulting mixture was maintained at 30° C. for 3 hours to conduct reaction.

1000 of methyl isobutyl ketone was then added thereto and was completely dissolved therein. The mixtures was washed with water to remove by-produced salts and the like, and then methyl isobutyl ketone was removed under a reduced pressure to obtain the desired active ester group-containing compound.

TABLE 1

| Preparation Conditions of Active Ester Group-Containing Compound | Preparation Example | | | |
|---|---|---|---|---|
| Amount used (g): | 1 | 2 | 3 | 4 |
| Hydroquinone | 110 | — | — | — |
| Bisphenol A | — | 228 | — | — |
| Tetrabromobisphenol A | — | — | 272 | — |
| Phenol novolak resin* | — | — | — | 206 |
| Benzoyl chloride | 281 | 281 | 141 | — |
| Methacrylic acid chloride | — | — | — | 209 |
| Pyridine | 500 | 500 | 400 | 400 |

*Manufactured by Gunei Chemical Co., hydroxy equivalent: 103 g/eq., softening point: 85° C.

EXAMPLES 1 TO 4 AND COMPARATIVE EXAMPLES 1 AND 2

In a 1-liter three-necked flask equipped with a thermometer, a stirrer, and a cooling tube were charged with an epoxy resin derived from bisphenol A or an epoxy resin derived from tetramethylbiphenol as an epoxy resin, each compound prepared in Preparation Examples 1 to 4 as an active ester group-containing compound, and bisphenol A or a phenol novolak resin as a phenol compound, in the respective amount shown in Table 2 below. The resulting mixture was heated to 130° C. to uniformly dissolve the same, and tetramethylammonium chloride or 2-methyl imidazole was then added thereto as a reaction catalyst in an amount shown in Table 2 below. Then, the mixture was gradually heated so that the temperature in the system reached 165° C. The mixture was maintained at 165° C. for 5 hours to conduct reaction.

After completion of the reaction, the reaction mixture was cooled and solidified to obtain the desired modified epoxy resin.

An epoxy equivalent and a softening point of the modified epoxy resins thus obtained were measured, and the results obtained are shown in Table 2 below.

TABLE 2

|  | Example 1 | Example 2 | Example 3 | Example 4 | Comparative Example 1 | Comparative Example 2 |
|---|---|---|---|---|---|---|
| Preparation Conditions of Modified Epoxy Resin: | | | | | | |
| Epoxy Resin Type | A | A | A | B | A | B |
| Amount used (g) | 500 | 500 | 400 | 600 | 500 | 700 |
| Active Ester Group-Containing Compound Type | Preparation Example 1 | Preparation Example 2 | Preparation Example 3 | Preparation Example 4 | — | — |
| Amount used (g) | 200 | 230 | 370 | 100 | — | — |
| Phenol Compound Type | — | — | — | — | C | D |
| Amount used (g) | — | — | — | — | 140 | 85 |
| Reaction Catalyst Type | E | E | E | F | E | F |
| Amount used (g) | 0.2 | 0.2 | 0.2 | 0.3 | 0.2 | 0.3 |
| Analytical Result: | | | | | | |
| Epoxy Equivalent (g/eq.) | 465 | 451 | 667 | 269 | 442 | 272 |
| Softening Point (° C.) | 70 | 69 | 78 | 65 | 67 | 64 |

A: Epoxy resin ("EPIKOTE 828", a trade name, manufactured by Yuka Shell Epoxy K.K., epoxy equivalent 186) derived from bisphenol A.
B: Epoxy resin ("EPIKOTE YX4000", a trade name, manufactured by Yuka Shell Epoxy K.K.; epoxy equivalent 186) derived from tetramethylbiphenol.
C: Bisphenol A.
D: Phenol novolak resin (manufactured by Gunei Chemical Co.: hydroxy equivalent 103 g/eq.; softening point 85° C.).
E: Tetramethylammonium chloride.
F: 2-Methyl imidazole

EXAMPLES 5 TO 8 AND COMPARATIVE EXAMPLES 3 AND 4

Each of epoxy resin compositions was prepared using each of the modified epoxy resins obtained in Examples 1 to 4 and Comparative Examples 1 and 2 as a modified epoxy resin, methyltetrahydrophthalic anhydride, dicyan diamide or a phenol novolak resin as a hardener, and 2-methyl imidazole as a curing accelerator.

After deforming, each of the compositions was cast into a metallic mold and cured at 180° C. for 8 hours to obtain each of test pieces.

A rate of moisture absorption and a dielectric constant of each cured resin was measured. The results obtained are shown in Table 3 below. Each molding material of Examples 5 to 8 had markedly low rate of moisture absorption and dielectric constant as compared with the molding materials of Comparative Examples 3 and 4.

The modified epoxy resin and the epoxy resin composition according to the present invention give a cured resin having excellent moisture resistance and electrical characteristics as compared with the conventional epoxy resin composition, and therefore they can be advantageously used in various uses such as coating, adhering, casting, sealing, molding, laminating, and the like.

While the invention has been described in detail and with reference to specific examples thereof, it will be apparent to one skilled in the art that various changes and modifications can be made without departing the spirit and scope thereof.

We claim:

1. An epoxy resin composition comprising:
   a modified epoxy resin produced by the process of (i) reacting: (a) an epoxy resin having at least at least at least two epoxy groups per one molecule, and (b) an active ester group-containing compound having at least two aromatic ring-bonded active ester groups, said

TABLE 3

| Epoxy Resin Composition | Example 5 | Example 6 | Example 7 | Example 8 | Comparative Example 3 | Comparative Example 4 |
|---|---|---|---|---|---|---|
| Modified Epoxy Resin Type | Example 1 | Example 2 | Example 3 | Example 4 | Comparative Example 1 | Comparative Example 2 |
| Amount used (g) | 100 | 100 | 100 | 100 | 100 | 100 |
| Curing Agent for Epoxy Resin Type | G | H | H | I | H | I |
| Amount used (g) | 35 | 2.8 | 1.9 | 38 | 2.8 | 38 |
| Curing Accelerator[1] | 1 | 0.1 | 0.1 | 0.5 | 0.1 | 0.5 |
| Properties of Cured Resin | | | | | | |
| Rate of Moisture Absorption[2] (%) | 0.41 | 0.38 | 0.36 | 0.33 | 0.62 | 0.56 |
| Dielectric Constant[3] | 2.8 | 3.0 | 2.9 | 2.8 | 3.9 | 3.9 |

G: Methyltetrahydrophthalic anhydride.
H: Dicyan diamide.
I: Phenol novolak resin (manufactured by Gunei Chemical Co.; hydroxy equivalent 103 g/eq.; softening point 85° C.).
[1]2-Methyl imidazole.
[2]Rate of moisture absorption after dipping in water at 110° C. for 100 hours.
[3]23° C., 1 $MH_2$ active ester groups are represented by the following chemical formula (1) or (2):

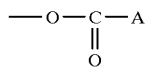
(1)

wherein A represents a phenyl group or naphthyl group;

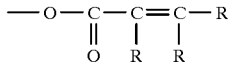
(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.1 to about 0.7 mol per mole of the epoxy group in the epoxy resin thereby producing the modified epoxy resin, and (ii) recovering the modified epoxy resin; and
    a curing agent for the epoxy resin wherein the curing agent comprises phenol, phenol resin, a polyhydric phenol, an acid anhydride and/or an amine reactive with the modified epoxy resin.

2. An epoxy resin composition comprising:
    a modified epoxy resin produced by the process of (i) reacting: (a) an epoxy resin having at least at least at least two epoxy resin groups per one molecule, and (b) an active ester group containing compound having at least two aromatic ring-bonded active ester groups, said active ester groups are represented by the following chemical formula (1) or (2):

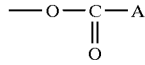
(1)

wherein A represents a phenyl group or naphthyl group;

(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.1 to about 0.7 mol per mole of the epoxy group in the epoxy resin thereby producing the modified epoxy resin, and (ii) recovering the modified epoxy resin;
    other epoxy resins; and
    a curing agent for the epoxy resin wherein the curing agent comprises a phenol, a phenol resin, a polyhydric phenol, an acid anhydride and/or an amine reactive with the modified epoxy resin.

3. An epoxy resin composition of claim 2, wherein the amount of the other epoxy resins is 100 parts by weight or less per 100 parts by weight of the modified epoxy resin.

4. An epoxy resin composition comprising:
    a modified epoxy resin comprising the reaction product of an epoxy resin having at least two epoxy groups per one molecule, and (b) an active ester group-containing compound having at least two aromatic ring-bonded active ester groups, said active ester groups represented by the following chemical formula (1) or (2):

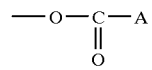
(1)

wherein A represents a phenyl group or naphthyl group;

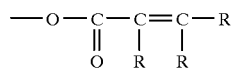
(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.05 to about 0.95 mol per mole of the epoxy group in the epoxy resin thereby producing the modified epoxy resin, and recovering the modified epoxy resin; and
    a curing agent for the epoxy resin.

5. An epoxy resin composition comprising:
    a modified epoxy resin comprising the reaction product of an epoxy resin having at least two epoxy groups per one molecule, and (b) an active ester group-containing compound having at least two aromatic ring-bonded active ester groups, said active ester groups represented by the following chemical formula (1) or (2):

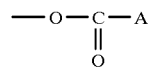
(1)

wherein A represents a phenyl group or naphthyl group;

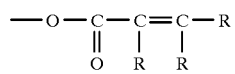
(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.05 to about 0.95 mol per mole of the epoxy group in the epoxy resin thereby producing the modified epoxy resin, and recovering the modified epoxy resin;
    other epoxy resins; and
    a curing agent for those epoxy resins.

6. An epoxy resin composition of claim 5 wherein the amount of other epoxy resins is 100 parts by weight or less per 100 parts by weight of the modified epoxy resin.

7. An epoxy resin composition comprising:
    a modified epoxy resin prepared by the process comprising reacting (a) an epoxy resin having at least two epoxy groups per one molecule, and (b) an active ester group-containing compound having at least two aromatic ring-bonded active ester groups, said active ester groups, said active ester groups are represented by the following chemical formula (1) or (2):

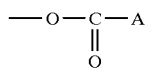

(1)

wherein A represents a phenyl group or naphthyl group;

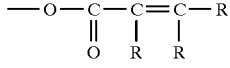

(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.05 to about 0.95 mol per mole of the epoxy group in the epoxy resin, wherein the active ester group-containing compound contains a group which reacts with the epoxy group, other than the active ester group, in an amount of 50 percent or less of the total number of the functional groups; and a curing agent for the epoxy resin.

8. An epoxy resin composition comprising:

a modified epoxy resin prepared by the process comprising reacting (a) an epoxy resin having at least two epoxy groups per one molecule, and (b) an active ester group-containing compound having at least two aromatic ring-bonded active ester groups, said active ester groups are represented by the following chemical formula (1) or (2):

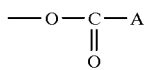

(1)

wherein A represents a phenyl group or naphthyl group;

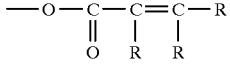

(2)

wherein R each independently is a hydrogen atom, an alkyl group having 1 to 10 carbon atoms, a phenyl group, an aralkyl group, an alkoxy group, or a halogen atom, in proportions such that the amount of the active ester group in the active ester group-containing compound is from about 0.05 to about 0.95 mol per mole of the epoxy group in the epoxy resin, wherein the active ester group-containing compound contains a group which reacts with the epoxy group, other than the active ester group, in an amount of 50 percent or less of the total number of the functional groups;

other epoxy resins; and a curing agent for those epoxy resins.

9. An epoxy resin composition of claim 8 wherein the amount of other epoxy resins is 100 parts by weight or less per 100 parts by weight of the modified epoxy resin.

* * * * *